United States Patent
Huiban et al.

(10) Patent No.: US 11,516,144 B2
(45) Date of Patent: Nov. 29, 2022

(54) INCREMENTAL DATA PROCESSING

(71) Applicant: AMADEUS S.A.S., Biot (FR)

(72) Inventors: Gurvan Nicolas Huiban, Opio (FR); Stephane Pierre-Henri Janel, Antibes (FR); Philippe François Georges Gentric, La-Colle-sur-Loup (FR); Herve Fresnel Eblohoue, Houilles (FR)

(73) Assignee: AMADEUS S.A.S., Biot (FR)

( * ) Notice: Subject to any disclaimer, the term of this patent is extended or adjusted under 35 U.S.C. 154(b) by 225 days.

(21) Appl. No.: 16/818,158

(22) Filed: Mar. 13, 2020

(65) Prior Publication Data
US 2020/0296051 A1    Sep. 17, 2020

(51) Int. Cl.
| | |
|---|---|
| *H04L 47/62* | (2022.01) |
| *H04L 43/0817* | (2022.01) |
| *H04L 43/0864* | (2022.01) |
| *H04L 43/087* | (2022.01) |
| *H04L 43/0894* | (2022.01) |
| *H04L 47/122* | (2022.01) |
| *H04L 47/25* | (2022.01) |

(52) U.S. Cl.
CPC ........ *H04L 47/6215* (2013.01); *H04L 43/087* (2013.01); *H04L 43/0817* (2013.01); *H04L 43/0864* (2013.01); *H04L 43/0894* (2013.01); *H04L 47/122* (2013.01); *H04L 47/25* (2013.01)

(58) Field of Classification Search
CPC ............. H04L 47/6215; H04L 43/0817; H04L 43/0864; H04L 43/087; H04L 43/0894; H04L 47/122; H04L 47/25
See application file for complete search history.

(56) References Cited

U.S. PATENT DOCUMENTS

| | | |
|---|---|---|
| 2004/0136324 A1 | 7/2004 | Steinberg et al. |
| 2009/0016331 A1 | 1/2009 | Shah et al. |
| 2009/0073921 A1 | 3/2009 | Ji et al. |
| 2010/0061231 A1 | 3/2010 | Harmatos et al. |
| 2017/0019327 A1 | 1/2017 | Lee |
| 2017/0126547 A1 | 5/2017 | Wood et al. |

FOREIGN PATENT DOCUMENTS

DE    10201622516    6/2018

OTHER PUBLICATIONS

Clausen, Thomas, et al. "The optimized link state routing protocol version 2." draft-ietf-manet-olsrv2-04. txt, Jul. 7, 2014, Retrieved from the Internet: URL: https://tools.ietf.org/pdf/rfc7181.pdf.

*Primary Examiner* — Siming Liu
(74) *Attorney, Agent, or Firm* — Perry + Currier Inc.

(57) ABSTRACT

Incremental data processing at a computerized device includes determining a number of data sets from a plurality of data sets, each comprising values in at least two dimensions. The device accesses priority lists for a subset of the data sets. The priority lists specify data values for an ordered number of dimension value sets. Each priority list is sequentially processed to determine the specified data values for combinations of dimension values that apply to device requirements. Processing is aborted when a data value is determined for each combination of the dimension values that apply to the device requirements. A data value is selected among the determined data values. A number of data sets is determined based on the selected data values. A network route from a source device to a target device can be determined in this manner.

12 Claims, 11 Drawing Sheets

| network operator 1 | | | | |
|---|---|---|---|---|
| Prio | Technology | Bandwidth | Service Time | Latency |
| 1 | wlan | 1 Gb/s | 6h-17h | 0.6s |
| 2 | satellite | 1 Gb/s | 6h-17h | 0.1s |
| 3 | wlan | 1 Gb/s | 17h-6h | 0.4s |
| 4 | cable | 2 Gb/s | 6h-17h | 0.3s |
| 5 | wlan | 2 Gb/s | 17h-6h | 0.15s |
| 6 | cable | 1 Gb/s | 6h-17h | 0.45s |
| 7 | cable | 1 Gb/s | 17h-6h | 0.4 |
| 8 | cable | 2 Gb/s | 17h-6h | 0.2s |
| 9 | satellite | 1 Gb/s | 17h-6h | 0.3s |
| 10 | satellite | 2 Gb/s | 17h-6h | 0.05s |
| ... | ... | ... | ... | ... |

| network operator 2 | | | | |
|---|---|---|---|---|
| Prio | Technology | Bandwidth | Service Time | Latency |
| 1 | satellite | 1 Gb/s | 6h-17h | 0.1s |
| 2 | cable | 1 Gb/s | 6h-17h | 0.3s |
| 3 | wlan | 1 Gb/s | 17h-6h | 0.25s |
| 4 | cable | 2 Gb/s | 6h-17h | 0.2s |
| 5 | wlan | 2 Gb/s | 17h-6h | 0.3s |
| 6 | any | 1 Gb/s | 17h-6h | 0.45s |
| 7 | cable | 1 GB/s | 17h-6h | any |
| 8 | any | 2 GB/s | 17h-6h | any |
| ... | ... | ... | ... | ... |

FIG. 4 initialize:

|        | wlan    | cab     |
|--------|---------|---------|
| 1 GB/s | <null>  | <null>  |
| 2 GB/s | <null>  | <null>  | set of network conditions prio 1:

|        | wlan    | cab     |
|--------|---------|---------|
| 1 GB/s | 0.6s    | <null>  |
| 2 GB/s | <null>  | <null>  | set of network conditions prio 4:

|        | wlan       | cab        |
|--------|------------|------------|
| 1 GB/s | 0.6s(6-17) | <null>     |
| 2 GB/s | <null>     | 0.3s(6-17) | set of network conditions prio 5:

|        | wlan        | cab        |
|--------|-------------|------------|
| 1 GB/s | 0.6s(6-17)  | <null>     |
| 2 GB/s | 0.15s(17-6) | 0.3s(6-17) | set of network conditions prio 6:

|        | wlan        | cab         |
|--------|-------------|-------------|
| 1 GB/s | 0.6s(6-17)  | 0.45s(6-17) |
| 2 GB/s | 0.15s(17-6) | 0.3s(6-17)  |

FIG. 6A network operator 1

|        | wlan        | cab         |
|--------|-------------|-------------|
| 1 GB/s | 0.6s(6-17)  | 0.45s(6-17) |
| 2 GB/s | 0.15s(17-6) | 0.3s(6-17)  | network operator 2

|        | wlan        | cab         |
|--------|-------------|-------------|
| 1 GB/s | 0.25s(17-6) | 0.3s(6-17)  |
| 2 GB/s | 0.25s(17-6) | 0.2s(6-17)  |

FIG. 6B set of network conditions prio 5: (700)

|  | wlan | sat | cab |
|---|---|---|---|
| 1 GB/s | 0.25s | <null> | <null> |
| 2 GB/s | 0.25s | <null> | <null> | set of network conditions prio 6: (701)

|  | wlan | sat | cab |
|---|---|---|---|
| 1 GB/s | 0.25s | 0.45s | 0.45s |
| 2 GB/s | 0.25s | <null> | <null> | set of network conditions prio 7: (702)

|  | wlan | sat | cab |
|---|---|---|---|
| 1 GB/s | 0.25s | 0.45s | 0.45s |
| 2 GB/s | 0.25s | <null> | 0.1s | set of network conditions prio 8: (703)

|  | wlan | sat | cab |
|---|---|---|---|
| 1 GB/s | 0.25s | 0.45s | 0.45s |
| 2 GB/s | 0.25s | 0.4s | 0.1s |

FIG. 7 initialize:

|  | 6h-17h | 17h-6h |
|---|---|---|
| 1 GB/s | <null> | <null> |
| 2 GB/s | <null> | <null> | set of network conditions prio 1:

|  | 6h-17h | 17h-6h |
|---|---|---|
| 1 GB/s | 0.6s (wlan) | <null> |
| 2 GB/s | <null> | <null> | set of network conditions prio 2: (800)

|  | 6h-17h | 17h-6h |
|---|---|---|
| 1 GB/s | 0.1s (wlan) | <null> |
| 2 GB/s | <null> | <null> | set of network conditions prio 3:

|  | 6h-17h | 17h-6h |
|---|---|---|
| 1 GB/s | 0.1s (wlan) | 0.4s (wlan) |
| 2 GB/s | <null> | <null> | set of network conditions prio 4:

|  | 6h-17h | 17h-6h |
|---|---|---|
| 1 GB/s | 0.1s (wlan) | 0.4s (wlan) |
| 2 GB/s | 0.3s (cab) | <null> | set of network conditions prio 5:

|  | 6h-17h | 17h-6h |
|---|---|---|
| 1 GB/s | 0.1s (wlan) (801) | 0.4s (wlan) |
| 2 GB/s | 0.3s (cab) | 0.15s (wlan) |

FIG. 8

INCREMENTAL DATA PROCESSING

CROSS-REFERENCE TO RELATED APPLICATIONS

This application claims priority to French patent application no. 1902554, filed Mar. 13, 2019, the contents of which is incorporated herein by reference.

FIELD

The present invention relates to incremental data processing which is, in one example, employed in network routing technology. In this particular example, it relates to determining network routes between communicating devices.

BACKGROUND

Communication and transfer of data packets are generally performed in a heterogeneous network landscape. The heterogeneity mainly relates to two aspects. On the one hand, when transferring data packets over a network, the data packets are sent from a source device to a target device over a range of different communication technologies such as wide area networks (WAN), local area networks (LAN), wireless local area networks (WLAN), fiber optic cable networks, satellite links, high-performance backbone links and/or peer-to-peer technology. The data packets usually traverse different network nodes which partition the network route from the source device to the target device into a number of route sections. On the other hand, the heterogeneity results from the fact, that since the early 2000s, network communication technology is no longer only supplied by infrastructure network operators, so called carriers, having their own physical facilities (data lines, relaying infrastructure) at their disposal. There are also virtual network operators (VNO) supplying communication infrastructure technology without own physical facilities. Instead, the VNOs rent routes or route sections from the carriers in order to offer individual network computer network solutions.

A VNO (as well as a carrier) manages the route sections of offered computer network solutions in order to assure the transfer of data packets in accordance with service level agreements (SLA). VNOs and carriers provide quality-of-service guarantees to clients (i.e. entities, such as devices and applications, which transfer data packets over the network) to satisfy technical data packet transfer requirements of the clients. SLAs guarantee a performance range and performance quality for the provided route sections and are defined in terms of thresholds of technical performance parameters such as bandwidth, latency, packet loss rate and others to be at least fulfilled. Hence, network operators like carriers as wells as VNOs have to balance the technical performance parameters in their network and/or route sections they provide. Further, the operators have to comply with the agreed SLA amongst a plurality of the clients, having diverse requirements depending on their individual ways to utilize the computer network.

From the client's perspective, computer networks are widely built up redundantly. This means that sending data packets from a client device to a target device may include choices between different network operators with their guaranteed SLA for the same route sections in the network route, and also choices between different network communication technologies and/or performance metrics that are suitable to their transmission requirements. These choices may be dependent on the kind of the data packet or transmission modalities, e.g. transferring backups to cloud storages, provide real-time streaming for video applications or others. In general, the transfer path is determined solely by the network operators and/or automatized procedures of network routing. Hence, in general, there is no or only limited control over the transfer modalities for a client device.

US 2009/0073921 A1 provides a system and methodology to forward data in hybrid mesh networks incorporating multiple wireless technologies. The methodology also includes to measure the transmission quality of data packets along a network route for terminating under-performing paths and improving service quality of mesh access networks.

DE 10 2016 225 164 A1 provides a methodology for data transmission in multi-hop networks. The methodology includes to assign weights to intermediate nodes in a network route from a source to a target node, depending on relevance to application of the intermediate node for the transmitted data packet.

RFC7181: Optimized Link State Routing Protocol Version 2 (OLSRv2) provides Routing Sets for routers, which are derived from the contents of other protocol sets of the router such as Link Sets, Neighbor Sets, Router Topology Set, Routable Address Topology Set and Attached Network Set. The signaling in OLSRv2 has been designed to define most direct connection between any pair of routers using minimum path length algorithms.

SUMMARY

A first more general aspect is directed to a method for incremental data processing which is performed by a computerized device. The method determines a number of data sets from a plurality of data sets, wherein the data sets of the plurality of data sets comprise at least two dimensions, each dimension being defined by a dimension type and each data set having a dimension value in each of the dimensions. The computerized device has access to at least one priority list for each of at least a subset of the data sets to be determined, wherein each priority list specifies data values for an ordered number of dimension value sets. The method comprises, at the computerized device: for each data set to be determined and each priority list available for the data set to be determined: sequentially processing the priority list along the ordered number of dimension value sets to determine the specified data values for combinations of dimension values that apply to requirements of the computerized device, aborting the sequential processing in response to determining that a data value is determined for each combination of the dimension values that apply to the requirements of the computerized device and selecting a most suitable data value among the determined data value; and determining a number of data sets on the basis of the selected data values.

A second more general aspect is directed to a computerized device which is arranged to perform the method of the first more general aspect. A third more general aspect is direct to a computer program product comprising program code instructions stored on a computer readable medium to execute the method of the first more general aspect.

The more general aspects can be employed in various use cases such as the following more specific aspects.

A first more specific aspect is directed to a method for determining a network route from a source device to a target device through a computer network, wherein the source device is connected to the target device via a plurality of network routes, each comprising at least one route section. At least one of the route sections is operated by at least two network operators, wherein the source device has access to network operator priority lists for at least a subset of the route sections. Each network operator priority list specifies quality-of-service guarantees of the network operator for an ordered number of network condition sets. The method comprises, at the source device for each route section considered and each network operator priority list available: sequentially processing the network operator priority list along the ordered number of network condition sets to determine the specified quality-of-service guarantees for combinations of network conditions that apply to requirements of the source device, aborting the sequential processing in response to determining that a quality-of-service guarantee is determined for each combination of the network conditions that apply to the requirements of the source device, and selecting a most suitable quality-of-service guarantee among the determined quality-of-service guarantees. The method then determines a network route from the plurality of network routes between the source device to the target device on the basis of the determined quality-of-service guarantees for the route sections.

A second more specific aspect is directed to a source device for determining a network route to a target device through a computer network being arranged to execute the methodology of the first aspect.

A third more specific aspect is directed to a computer program product comprising program code instructions stored on a computer readable medium to execute the method steps according to the methodology of the first aspect when said program is executed on a computer.

In an example of the more specific aspects, the network condition sets comprise one or more individual network conditions being defined by at least a respective type and a value. The combinations of network conditions that apply to the requirements of the source device comprise at least a requirement value, respectively. Sequentially processing the network operator priority list along the number of network condition sets further includes initializing a data structure for processing the combination of network conditions that apply to the requirements of the source device with respective null quality-of-service values, for each processed network condition set, in response to determining that the value of a network condition being part of the requirement subset, as identified by the type, is in accordance with the requirement value, setting the respective null quality-of-service guarantee value in the data structure to a specified quality-of-service guarantee value of the processed network condition set in the network operator priority list and aborting the sequential processing in response to determining that the data structure does not contain any null quality-of-service guarantee value anymore.

In an example of the more specific aspects, at least one network condition in the network condition set is specified by a generic value covering any potential values of the at least one network conditions. Sequentially processing the network operator priority list along the ordered number of network condition sets includes for each processed network condition set, in response to determining that the value of a network condition being part of the requirement subset as identified by the type, is the generic value, setting the respective null quality-of-service guarantee value in the data structure to the specified quality-of-service guarantee value of the processed network condition set in the network operator priority list.

In an example of the more specific aspects, sequentially processing the network operator priority list along the number of network condition sets further includes for each processed network condition set, in response to determining that the value of a network condition being part of the requirement subset, as identified by the type, is in accordance with the requirement value and in response to determining that the data structure already does not contain a null quality-of-service guarantee value for the quality-of-service guarantee specified by the network condition set, discarding the network condition set.

In an example of the more specific aspects, sequentially processing the network operator priority list along the number of network condition sets further includes for each processed network condition set, in response to determining that the value of a network condition being part of the requirement subset, as identified by the type, is in accordance with the requirement value and in response to determining that the data structure already does not contain a null quality-of-service guarantee value for the quality-of-service guarantee specified by the network condition set, replacing the quality-of-service guarantee in the data structure by the quality-of-service guarantee value for the quality-of-service guarantee specified by the currently processed network condition set in response to determining that the quality-of-service guarantee value for the quality-of-service guarantee specified by the currently processed network condition set is more suitable than the quality-of-service guarantee of the data structure.

In an example of the more specific aspects, the network conditions include at least one of a type: time of network usage, transmission technology of the route section, latency, jitter, packet loss rate, bandwidth.

In an example of the more specific aspects, the quality-of-service guarantees in the priority lists include at least one of a type: latency, packet loss rate and jitter, and the most suitable quality-of-service guarantee is given by the minimum determined quality-of-service guarantee.

In an example of the more specific aspects, the quality-of-service guarantees in the priority list include a type: bandwidth and the most suitable quality-of-service guarantee is given by the maximum determined quality-of-service guarantee.

In an example of the more specific aspects, the quality-of-service guarantee assigned to a combination of network conditions is determined by an aggregation of quality-of-service guarantees of different types.

In an example of the more specific aspects, at least a part of the network operator priority lists is updated upon a request by the source device or by a provision from the respective network operator.

BRIEF DESCRIPTIONS OF THE DRAWINGS

The present mechanisms will be described with reference to accompanying figures.

FIG. 1 visualizes incremental data processing according to the more general aspects described herein.

FIG. 2A is a UML diagram of an exemplary computer network and its functional entities.

FIG. 2B presents an example of a hybrid computer network.

FIG. 4 is an example of network operator priority lists.

Figures 5A, 5B:
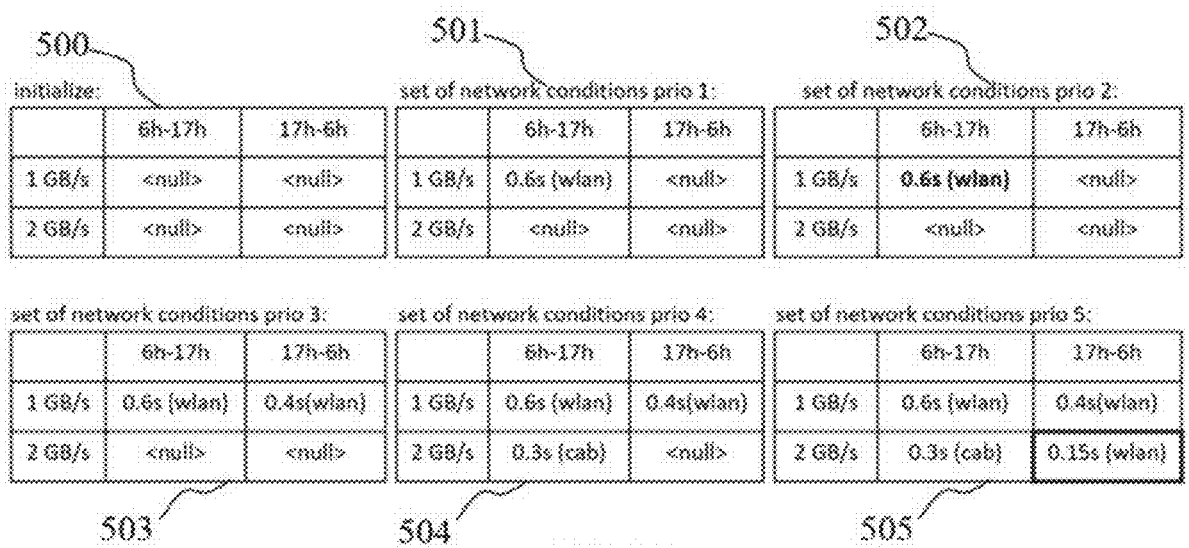

FIG. 5A visualizes how QoS guarantees are assigned.

FIG. 5B is a comparison of the result of processing two network operator priority lists.

FIG. 6A visualizes the processing of a priority list, with network condition sets to be skipped.

FIG. 6B is a comparison of the result of processing two network operator priority lists.

FIG. 7 visualizes the processing of a priority list, when a network condition set includes a generic "any" value.

FIG. 8 visualizes the processing of a priority list, when QoS guarantees are substituted because they are more suitable.

Figure 9:
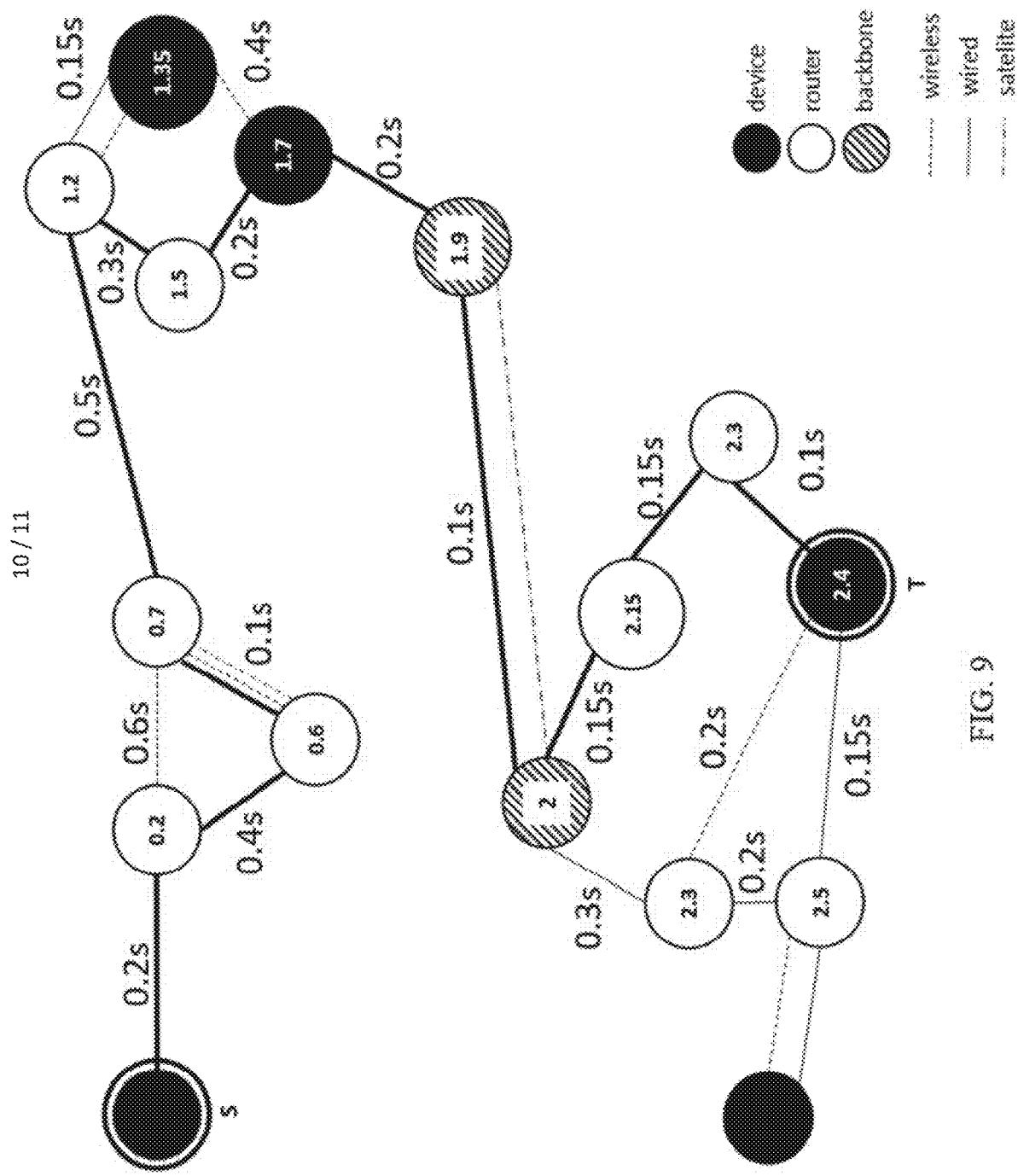

FIG. 9 shows a relaxed graph implementing the computer network of FIG. 2 after application of a Dijkstra algorithm.

Figure 10:
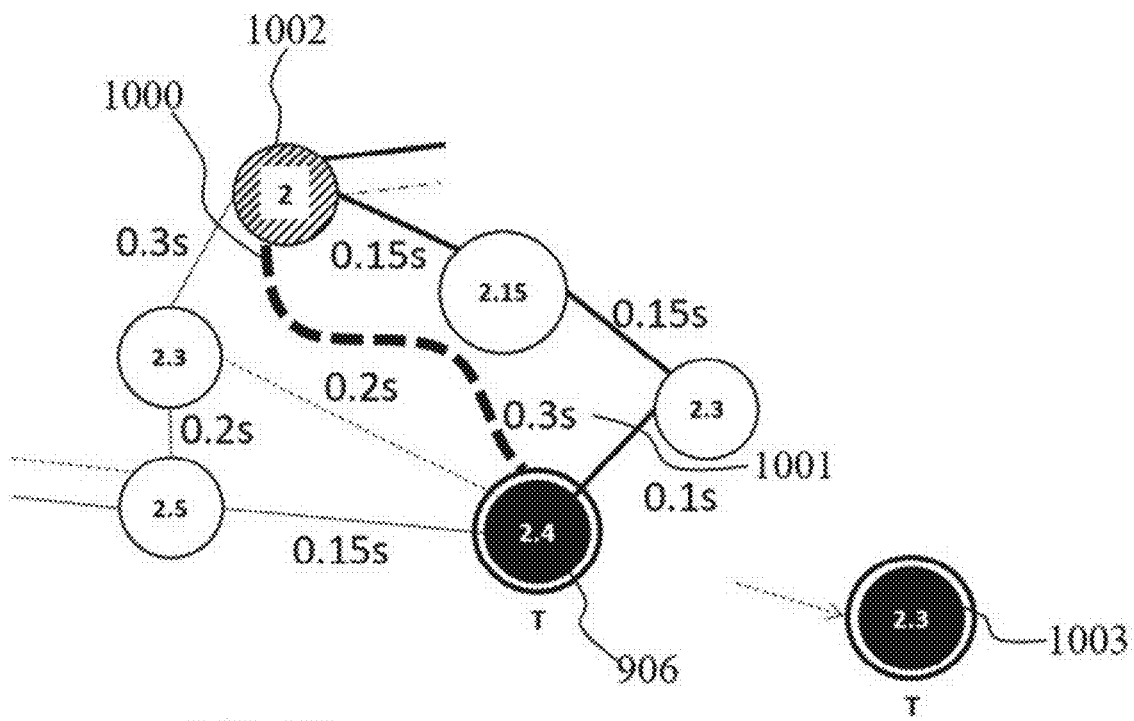

FIG. 10 shows a detail of the computer network of FIG. 2 and FIG. 9 including an additional edge the source device has knowledge of.

Figure 11:
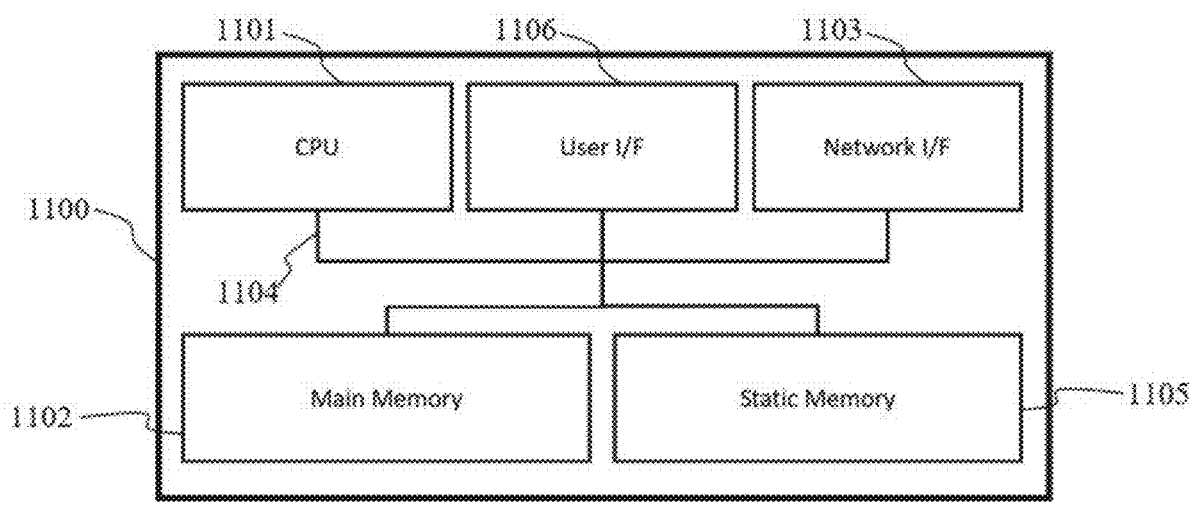

FIG. 11 presents a diagrammatic computer system arranged as source device.

DETAILED DESCRIPTION

Figure 1:
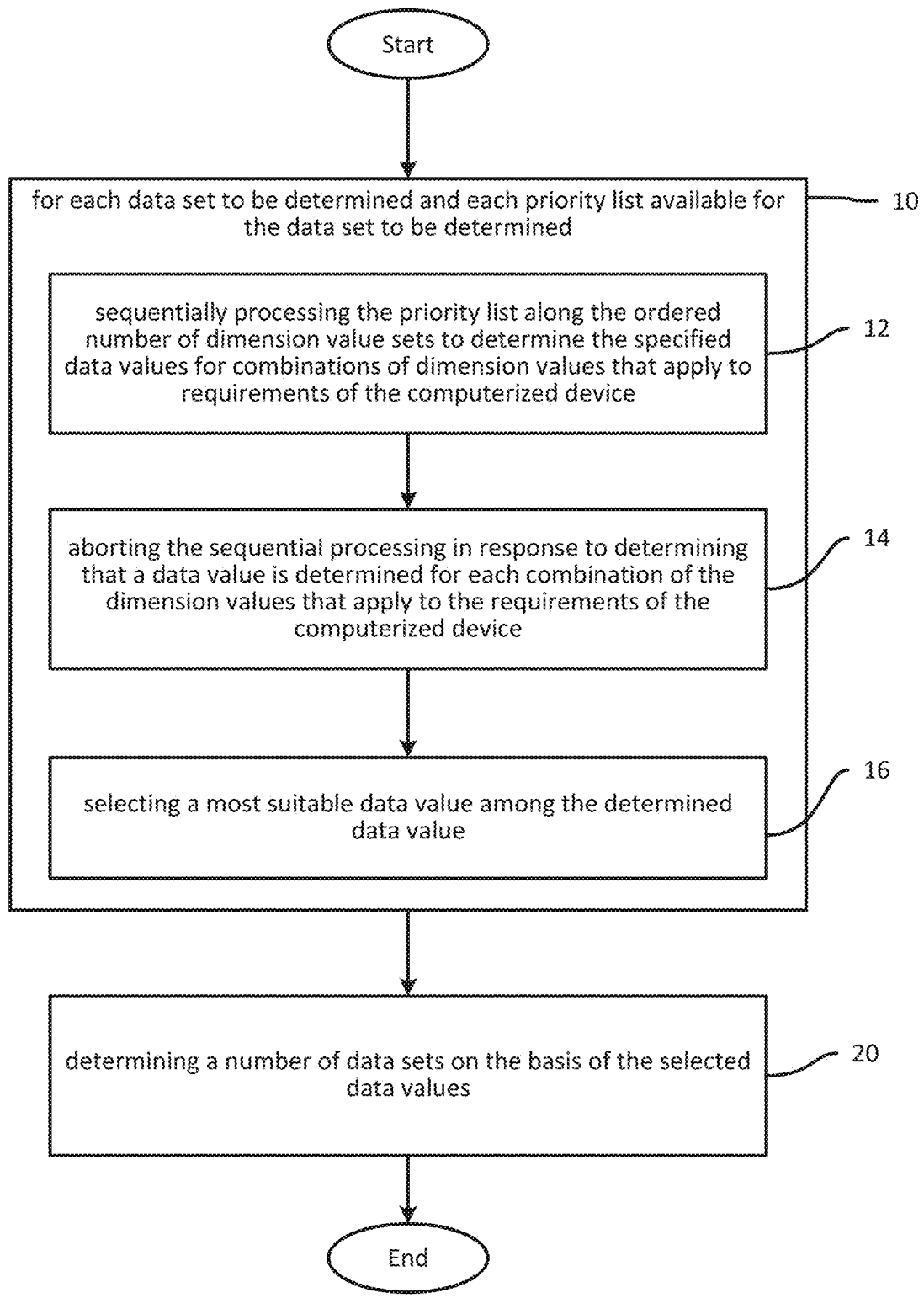

With reference to the more general aspects described herein, FIG. 1 relates to incremental data processing which is performed by a computerized device. The computerized device may be any sort of computers, such as personal computers, computer stations, workstations, servers, notebooks, tablets, smartphones. An example of a computerized device 1100 and its internal structure is given further below with reference to FIG. 11.

The method of FIG. 1 determines a number of data sets from a plurality of data sets, wherein the data sets of the plurality of data sets comprise at least two dimensions, each dimension being defined by a dimension type and each data set having a dimension value in each of the dimensions. The computerized device has access to at least one priority list for each of at least a subset of the data sets to be determined, wherein each priority list specifies data values for an ordered number of dimension value sets. The method comprises, at the computerized device, for each data set to be determined and each priority list available for the data set to be determined (box 10): sequentially processing 12 the priority list along the ordered number of dimension value sets to determine the specified data values for combinations of dimension values that apply to requirements of the computerized device, aborting 14 the sequential processing in response to determining that a data value is determined for each combination of the dimension values that apply to the requirements of the computerized device, and selecting 16 a most suitable data value among the determined data value. Once, processing 10 has been concluded, a number of data sets is determined 20 on the basis of the selected data values.

The method of FIG. 1 can be advantageously employed in many use-cases to process data of different types in this manner. Technical advantages of the processing of FIG. 1 will become apparent from the detailed description of some of these examples further below. In some examples, price or tax information for flight connections is processed. In other examples, network routes are determined by using the methodology of FIG. 1.

With reference to a first more specific example of the methodology of FIG. 1, prices, such as tax amounts, for air travels are calculated. In these examples, the number of data items to be determined are price records for a plurality of legs of an air travel. The at least two dimensions comprise at least one of the types flight number and aircraft model. The priority lists are air carrier priority lists. The data values indicate prices of the respective air carrier for the dimension value sets for the respective legs of the air travel. Selecting the most suitable data value among the determined data values comprises selecting the lowest price among the determined prices.

An air travel for which prices are to be calculated may comprise multiple legs (pairs of origin and destination). A leg price may be determined for each leg, the sum of which amounts to the overall price. Note that the term price might relate to a particular type of price such as flight tax or airport fees, air carrier base fares or air carrier surcharges, and the like. Moreover, each leg may be servable by multiple air carriers such as Lufthansa and Air France. Each air carrier may have established a priority list for each of the leg that is served by the particular carrier. A priority list includes an ordered list of price records, the price records including multiple dimensions with corresponding dimension value such as flight numbers (e.g. LH 110, or groups of flight numbers such as LH [120, 150]), aircraft models, aircraft model classes and/or aircraft model restrictions (such as Airbus 380, Boeing 747, no restrictions), booking classes (such as business, eco flex, etc.), and others. One of the dimensions includes the specified data values, here: the price values.

In the price processing examples, sequentially processing 12 the priority list along the ordered number of dimension value sets to determine the specified data values for combinations of dimension values that apply to requirements of the computerized device may comprise initializing a matrix being defined by the dimension values of at least two of the dimensions of the priority lists. Continuing the example numbers given above, the matrix for a particular air travel leg for the air carrier Lufthansa may be defined by the two dimensions flight number and aircraft model in accordance with service requirements e.g. of the customer, e.g.

|       | LH110 | LH130 | LH160 |
|-------|-------|-------|-------|
| A380  |       |       |       |
| A340  |       |       |       |

The priority list may be sequentially processed by placing the data value of each data record into the corresponding matrix cell until each cell of the matrix is filled with at least one value. For example, if the first data record of the Lufthansa priority list for the air travel leg concerned refers to flight LH 110, but specifies the aircraft to be a Boeing 747, no match is detected and no matrix cell is filled. The second data record of the priority list may refer to both, flights LH130 and LH160 and define an Airbus 380 as the aircraft model, as well as indicate a price of 450 EUR. Hence, the two cells LH130/A380 and LH160/A380 are filled with the value 450 EUR. The third data record of the priority list may not specify any particular flight number and may thus be applicable to all Lufthansa flights, indicate the aircraft to be an Airbus 340 and mention a price of 300 EUR. Hence, all three A340 matrix cells are filled with the price 300 EUR. The next data record of the priority list may then refer to LH110, but not specify and particular aircraft model, and set out a price of 250 EUR. Hence, the last remaining matrix cell LH110/A380 is filled with the price of 250 EUR. Although the priority list may still include many more list entries (data records), the sequential processing 12 is then aborted 14 in response to determining that there is no empty cell of the matrix remaining. The most suitable data value is then determined 16, i.e. in the example 250 EUR for the dimension value combination of LH110/A380 which is to be determined to be the most favourable offer of Lufthansa for the air travel leg concerned. The same processing may then continue for further air travel carriers for the same leg and/or for further air travel legs.

As understood by persons skilled in the art, this processing methodology is efficient as result determination does not necessitate complete processing potentially large sets of underlying data (priority lists).

It is noted that situations might occur in which processing already terminates before all matrix cells are filled with data values, e.g. when a priority list does not specify data values for all dimension value combinations defined by a matrix. Hence, in these situations, sequential processing 12 might terminate in response to determining that the priority list was processed completely. In these situations, still empty matrix cells might be set to a default value, and determining 16 occurs in the normal manner. Examples of these situations are also further described in more detail below.

Figure 2A:
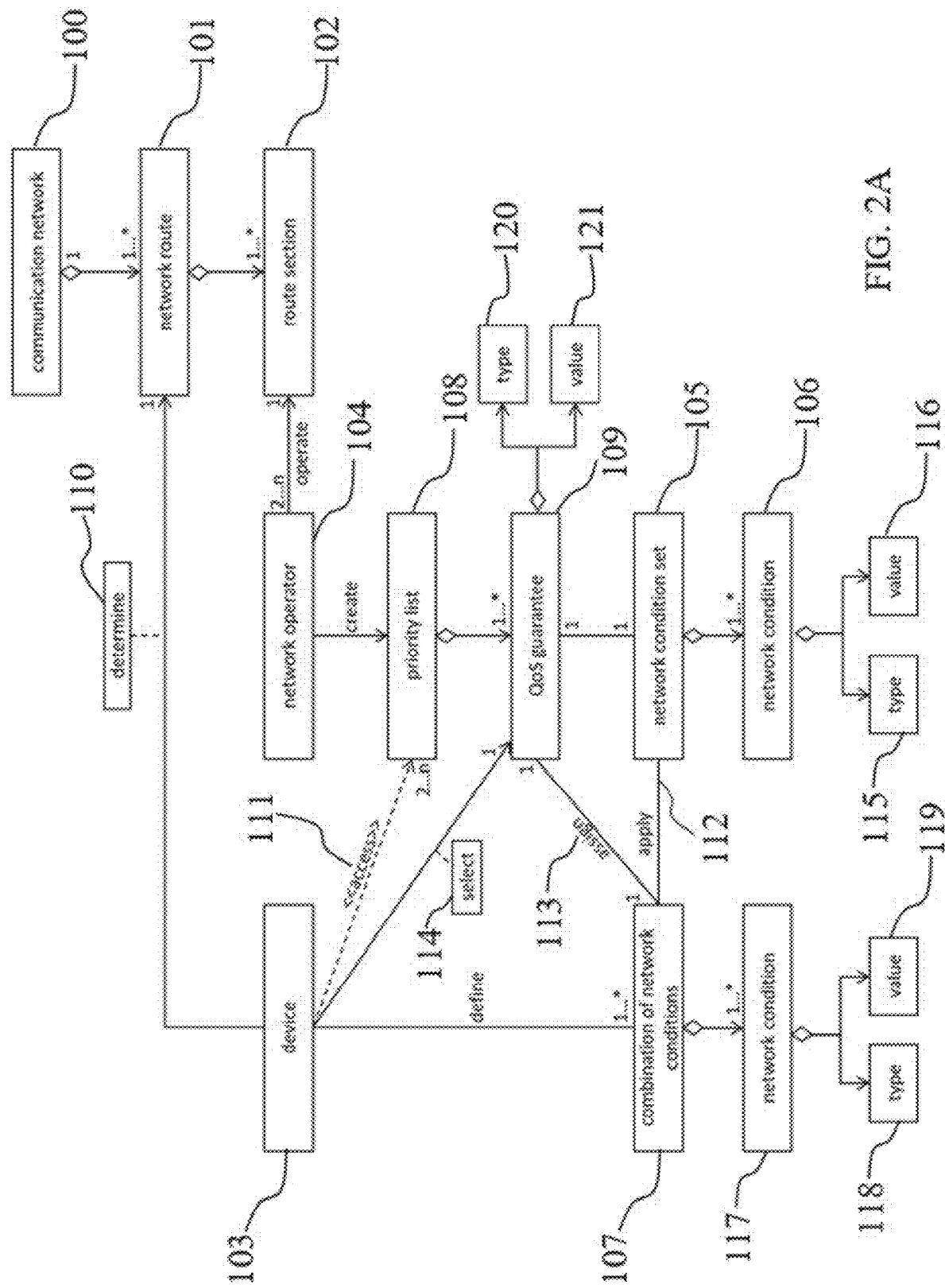
Figure 2B:
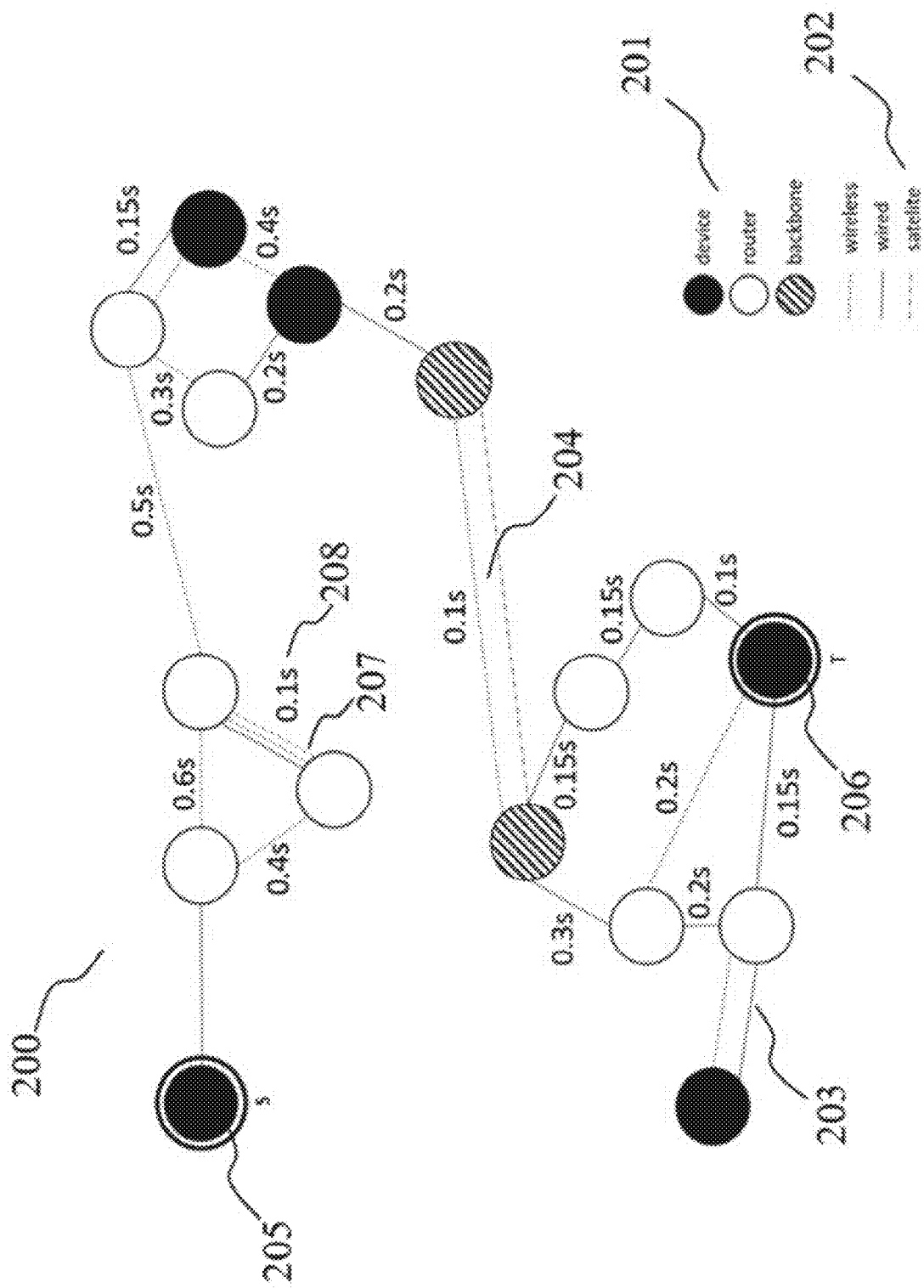

With reference to the more specific network route selection aspects described herein, a computer network 100, 200 is exemplarily shown in FIG. 2A and FIG. 2B. The computer network 100, 200 includes one or more network routes 101 from a source device 103, 205 to a target device 206. Each network route 101 includes one or more route sections 102. The network routes 101 of the computer network 100, 200 either include route sections 102 utilizing the same communication technology, e.g. a wireless computer network 100 providing solely network routes 101 including wireless route sections 102, a wired computer network 100 providing solely network routes 101 including wired route sections 102, or hybrid communication technology, e.g. a hybrid mesh network 200. Such a hybrid computer network 100, 200 includes different device technologies 201 such as nodes instantiated as devices (laptop, mobile station, personal computer (PC), server), routers or serviced backbone nodes, accumulating a variety of network nodes in a single node. Additionally, hybrid computer networks 100, 200 in general also include different route section technologies 202 such as wireless, wired or satellite connections. Some of the route sections 102 are connected by more than one communication technology 204, 207. Some of the connections between nodes in the computer network 100, 200 may not participate 203 as route section 102 in a network route 101 from a source device 103, 205 to a target device 206, since these route sections 102 are not included in a potential network route between the source device 103, 205 and the target device 206.

At least one of the route sections 102 with the respective communication technologies 202 is operated by two or more network operators 104, which for example are carriers or virtual network operators. A source device 103, 205 determines 110 a network route 101 to a target device 206 in the computer network 100, 200 according to the methodology set forth in FIGS. 3A and 3B discussed in more detail below. The network operators 104 balance traffic on the operated route sections 102 in their managed computer network 100, 200 in order to optimally utilize the network sections 102 to technical capacities. Traffic balancing utilizes different network condition sets 105, such as network condition sets 105 including network conditions 106 as latency, bandwidth and packet loss rate. The network operators 104 create priority lists 108 including the network condition sets 105 and provide access to the priority lists 108 to a source device 103, 205. Examples of priority lists 108 are given by FIG. 4 explained further below. In these example embodiments, the priority lists 108 include network condition sets 404 providing network conditions of the type "Technology", "Bandwidth", "Service Time" and "Latency" with respective values assigned at different priority levels. The source device 103, 205 e.g. processes "Latency" as the desired quality-of-service guarantee 109 metrics, and defines network conditions in the combinations of network conditions 107 that apply to the requirements of the source device 103, 205 with defined values 119 to be fulfilled e.g. bandwidth and service time and accepts any other value for network conditions 106 that are not in scope of the defined combinations of network conditions 107. In some example embodiments, the source device 103, 205 may also exclude values 116 of network conditions 106, e.g. excluding a provided technology such as satellite communication, if they are contradictory to the requirements of the source device 103, 205.

A source device 103, 205 may be a laptop, PC or another kind of end device as well as each kind of device processing transmission of data packets may. On the one hand, the source devices 103, 205 packets have quality-of-service requirements expressed by combinations of network conditions 107, depending on the kind and amount of data packets to transmit, e.g. including a requirement for at least 2 GB/s bandwidth in order to send a data packet with a latency of not more than 7 ms. On the other hand, the network operators 104 offer network resources to the source devices 103, 205 as defined by the priority lists 108 including quality-of-service (QoS) guarantees 109 to source devices 103, 205 depending on prioritized network condition sets 105. The network condition sets 105 with their respective QoS guarantees 109 are related to the combination of network conditions 107 that apply to the requirements of the source device 103, 205 and also balance the operated route sections 102 in the computer network 100, 200.

Figure 3A:
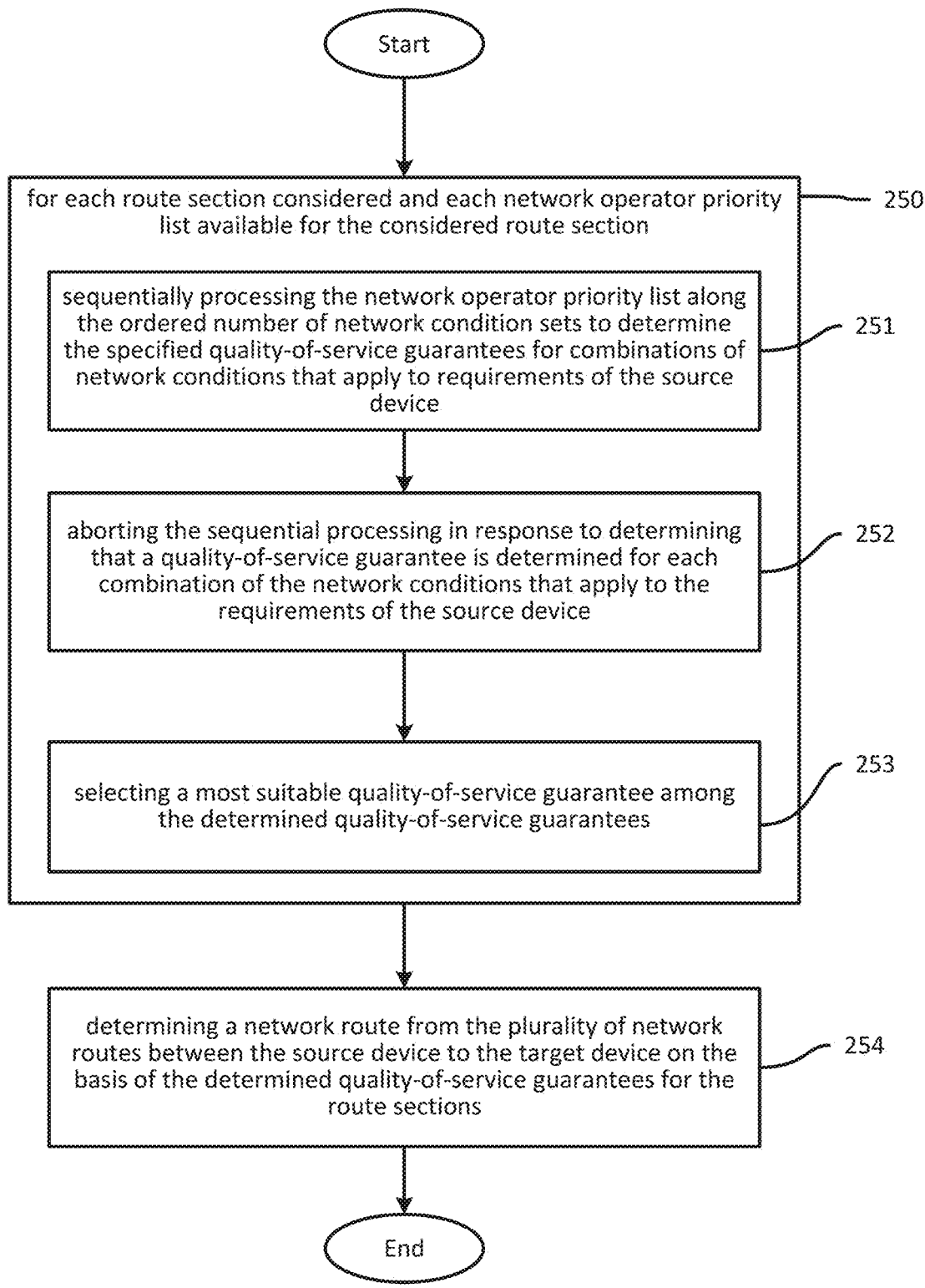
FIGS. 3A and 3B are flowcharts showing the methodology to determine a suitable network route in the computer network.
Figure 3B:
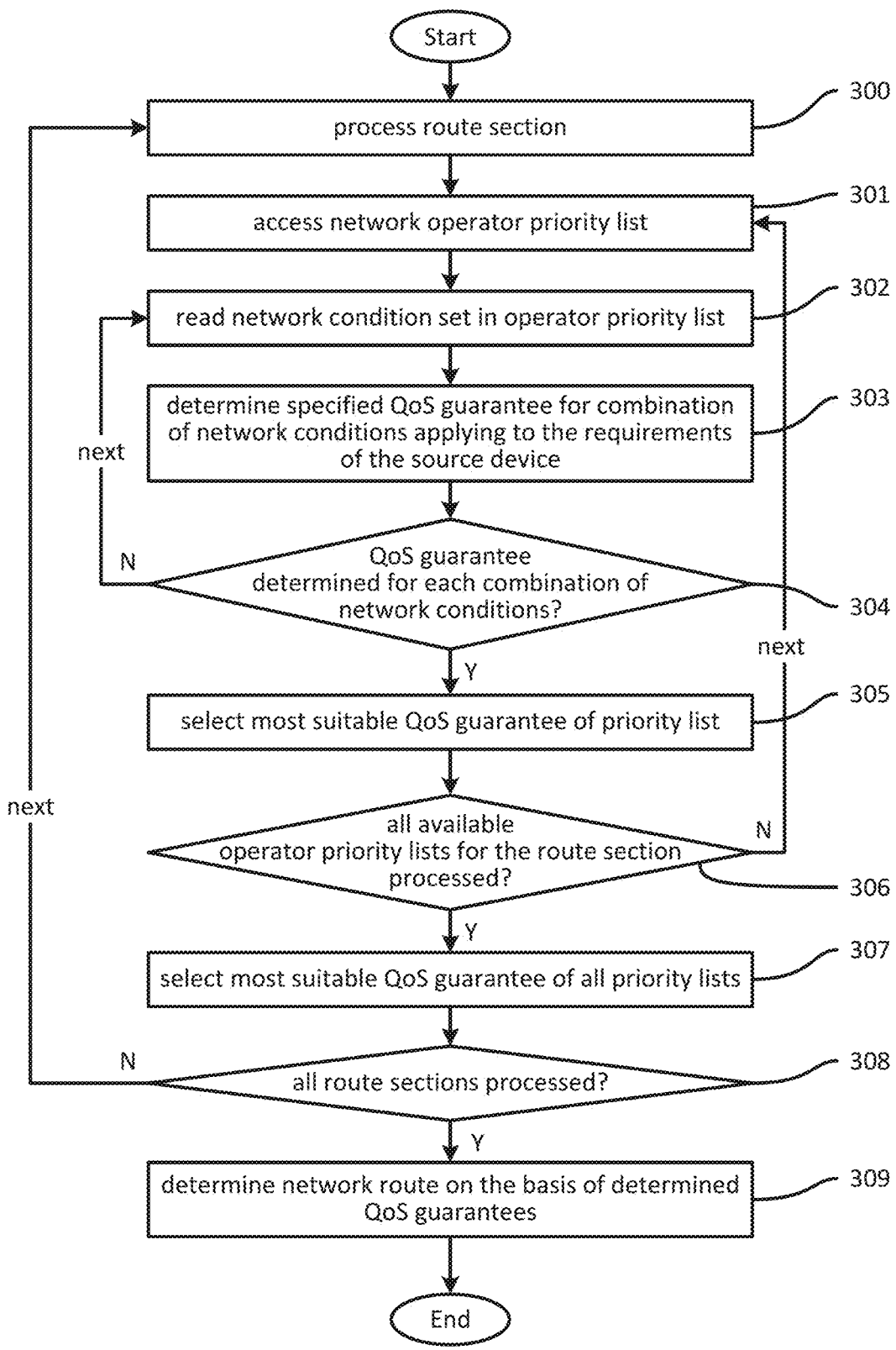

In order to transmit data packets to a target device 206 through the computer network 100, 200 the source device 103, 205 processes the priority lists 108 of the network operators 104 and determines 110, 309 a suitable network route 101 (FIGS. 3A and 3B). Depending on the respective characteristics of the transmission, e.g. packets are to be transmitted with preferably low latency or with low packet loss rate the source device 103, 205 considers different quality-of-service metrics as a decision factor when determining a suitable network route 101. A general process of determining (254) a network route from a source device to a target device through a computer network as taught herein is shown by FIG. 3A. The process includes, at the source device for each route section considered and each network operator priority list available (250): at block 251, sequentially processing the network operator priority list along the ordered number of network condition sets to determine the specified quality-of-service guarantees for combinations of network conditions that apply to requirements of the source device; at block 252 aborting the sequential processing in response to determining that a quality-of-service guarantee is determined for each combination of the network conditions that apply to the requirements of the source device; and block 253, selecting a most suitable quality-of-service guarantee among the determined quality-of-service guarantees.

FIG. 3B is a more specific example how the more general process of FIG. 3A may be realized in some optional embodiments. The methodology is processed 300 for each route section 102 of the plurality of network routes 101 from the source device 103, 205 to the target device 206. For each route section 102 and each network operator 104 operating this route section 102 a priority list 108 is accessed 111, 301. From the priority list 108 the first network condition set 105 is read 302 and applied 112, 303 to the combinations of network conditions 107 that apply to the requirements of the source device 103, 205. If the respective combination of network conditions 107 is found, the QoS guarantee 109 specified for this first network condition set 105 is assigned 113, 303 to the respective combination of network conditions 107. Therewith, the specified QoS guarantee 109 for the combination of network conditions 107 is determined 303. Then the next network condition set 105 is read from the priority list 108 of the respective network operator 104 of the respective route section 102 and the next QoS guarantee 109 is determined 112, 113, 303 as described before. The process stops 304 for the respective priority list 108, if each combination of network conditions 107 that apply to the requirements of the source device 103, 205 has been assigned 113, 303 with a QoS guarantee 109. Network condition sets 105 in the priority list 108 that have not yet been processed are discarded in order to reduce computational cost.

Hence, since at least one of the route sections 102 in the computer network 100, 200 is operated by two or more network operators 104 providing actual priority lists 108 including potentially a large number (e.g. in the order of 50 or 100, or more) of network condition sets 105, the source device 103, 205 may be affected by high computational costs when iterating through the quality-of-service conditions of all possible network routes 101 including the respective route sections 102 from the source device 103, 205 to the target device 206 to determine a network route 101 realizing a global estimated optimum of QoS guarantees 109 throughout the whole computer network 100, 200. Since the network condition sets 105 and related QoS guarantees are specified in the priority lists 108 in a given sequence, in order to balance the network traffic according to the technical capacities and characteristics of the route sections 102, the methodology shown in FIG. 3 aborts the processing of a priority list 108 of each network operator 104 in response to determining that a QoS guarantee 109 is found for each of the combinations of network conditions 107 that apply to the requirements of the source device 103, 205, therewith estimating a most suitable QoS guarantee 109 for the respective route section 102 utilizing limited computing resource of the sources device 103, 205.

Then the most suitable QoS guarantee 109 (e.g. minimum or maximum) is selected 305 among all assigned QoS guarantees 109 from the priority list 108. For example, the minimum among all assigned QoS guarantees 109 is selected 305 if the QoS guarantees 109 relate to latency, since the source device 103, 205 requires a low latency for sending a data packet as fast as possible to the target device 206. For other QoS guarantee examples, such as bandwidth, the maximum is selected 305.

The aforementioned process is repeated 306 with the next priority list 108 of another network operator 104 operating the same route section 102, as long as there are priority lists 108 from network operators 104 for this route section 102 that can be accessed 111. Finally, the most suitable QoS guarantee 109 is then selected 114, 307 amongst all priority lists 108 and is assigned as weight for the route section 102, therewith estimating the most suitable transmission metrics to be expected.

The process is then repeated 308 for other route sections 102 of the plurality of network routes 101 from the source device 103, 205 to the target device 206. As a result, these routes sections 102 are weighted 208 with a most suitable QoS guarantee 109 and are potentially chosen to be provided by different network operators 104. Hence, finally a network route 101 following the most suitable QoS values 208 from the source device 103, 205 to the target device 206 is determined 110, 309. For example, a shortest path algorithm is applied in order to determine 110, 309 the network route 101 with a minimum latency with respect to the assigned QoS values 109. This network route 101 is an estimated route based on the offered QoS guarantees 109 of the network operators 104 which have been determined by the process to be most suitable. The actual latency may differ when the data packet actually is sent via the determined network route 101. Hence, this route may not actually be the most optimal route from the source device 103, 205 to the target device 206, but is has been estimated by an acceptable amount of computational load of the source device 103, 205 to be suitable.

In some embodiments, the network condition sets 105 comprise one or more individual network conditions 106 being defined by at least a respective type 115 and a value 116, wherein the combinations of network conditions 107 that apply to the requirements of the source device 103, 205 include at least a requirement subset of the individual network conditions 106, 117 and are defined by the type 118 and a requirement value 119, respectively. The sequential processing 303 of the network operator priority list 108 along the number of network condition sets 105 includes: initializing a data structure for processing the combination of network conditions 107 that apply to the requirements of the source device 103, 205 with respective null quality-of-service guarantee values, for each processed network condition set 105, in response to determining 303 that the value 116 of a network condition 106 being part of the requirement subset, as identified by the type 115, 118, is in accordance with the requirement value 119, setting the respective null quality-of-service guarantee value in the data structure to a specified quality-of-service guarantee value 121 of the processed network condition set 105 in the network operator priority list 108, and aborting 304 the sequential processing 303 in response to determining that the data structure does not contain any null quality-of-service guarantee value anymore.

In an example embodiment, a route section 102, 207 is operated by two network operators 104, 400, 401 using three different communication technologies 202. The source device 103, 205 has access 111, 301 to priority lists 108, 402, 403 for the route section 102, 207 of each of the two network operators 104, 400, 401 (FIG. 4). The source device 103, 205 prepares for transmitting data packets to a target device 206 by determining 110 a suitable network route 101. The source device 103, 205 estimates a most suitable network route 101 on the basis of the accessed 111 priority lists 108, 402, 403 according to the methodology set forth in FIG. 3. Depending on the use-case and the application at the application layer, the technical goal of the source device 103, 205 might be a fast transmission of the data packets, thus a low latency. Hence, this is the QoS metric taken into account. The requirements of the source device 103, 205 allow for transmitting the data packets with a bandwidth with values 119 of 1 GB and 2 GB and at time 6 h-17 h as well as at time 17 h-6 h. The kind of communication technology viz. WLAN, cable or satellite is not relevant for the source device 103, 205 in this example. Hence, the requirement subsets 107 of individual network conditions 106, 117 include 2-dimensional combinations of network conditions 107 of types 119 {bandwidth, time} and the values 118 {1 GB/s, 6 h-17 h}, {1 GB/s, 17 h-6 h}, {2 GB/s, 6 h-17 h}, {2 GB/s, 17 h-6 h}. However, the dimension of the requirement subset and/or combinations of network conditions 107 is not restricted to 2-dimensions. The combinations of network conditions 107 are processed by a matrix data structure in the 2-dimensional example as shown in FIG. 5A.

First, the matrix data structure for processing the combinations of network conditions 107 is initialized 500 with respective null quality-of-service guarantee values in FIG. 5A. Then the source device 103, 205 reads the first network condition set 105, 404 in the first network operator priority list 108, 402 yielding values 116 for the different types 115 of network conditions 106 as communication technology, bandwidth and service time. The communication technology however might be ignored or taken for the actual transmission procedure into consideration. The first network condition set 105 being part of the requirement subset, identified by the type 115, 118 is a type "bandwidth" with a value 116, 119 of 1 GB/s and a type "service time" with a value 116, 119 of 6 h-17 h. Hence, the combination of network conditions 107 which is in accordance 303 with the read network condition set 105, 404 is {1 GB/s, 6 h-17 h}. The QoS guarantee 109 regarding latency in the priority list 108, 402 of 0.6 s is then assigned 113, 303, 501 to the respective combination of network conditions 107 in the matrix data structure. Since there are still combinations of network conditions 107 for which no QoS guarantee 109 has been assigned 113, 303, the next network condition set 105 in the first priority list 108, 402 is read 302. The read network condition set 105 again is in accordance with the combination of network conditions 107 {1 GB/s, 6 h-17 h}. The sole difference is based on the communication technology WLAN/satellite, whereby the type of the communication technology is not defined as decision factor for the processing of the source device 103, 205 in this example. Hence, since the combination of network conditions 107 {1 GB/s, 6 h-17 h} already has an assigned QoS guarantee 109 of higher priority, the current QoS guarantee 109 is discarded and the processing continues reading 302 the next network condition set 105. The next network condition set 105 is in accordance with the combination of network conditions 107 {1 GB/s, 17 h-6 h}. Hence, the QoS guarantee 109 for this network condition set 105 is assigned 113, 303, 503 to this combination of network conditions 107. In the further processing, a QoS guarantee value 121 of 0.3 s is assigned 113, 303, 504 to the combination of network conditions 107 {2 GB/s, 6 h-17 h} reading 302 the network condition set 105 of priority four, and a QoS guarantee value 121 of 0.15 s is assigned 113, 303, 505 to the combination of network conditions 107 {2 GB/s, 6 h-17 h}. After processing the first five network condition sets 105 in the first priority list 108, 402, all combinations of network conditions 107 being part of the requirement subset of the source device 103, 205 have been assigned 113, 303 with a QoS guarantee 109. Therewith the matrix data structure does not contain any null QoS value anymore 304. The processing of the first priority list 108, 402 stops 304.

Since the QoS guarantee 109 required by the source device 103, 205 is low latency, the minimum from all assigned QoS guarantee values 121 of the first priority list 108, 402 is selected 305, 505, yielding a most suitable QoS guarantee value 121 of 0.15 s. The processing continues 306 with the second accessible priority list 108, 403 of the second network operator 104, 401 for the respective route section 102, 207, yielding a most suitable QoS guarantee value 121 of 0.1 s as presented in FIG. 5B on the right-hand side.

Since for the respective route section 102, 207 only the two priority lists 108, 402, 403 are accessible 111, after processing the two priority lists 108, 402, 403 a most suitable QoS guarantee value 121 of all priority lists 108 is selected 114, 307. In this example, as can be seen by FIG. 5B network operator 1 offers a most suitable latency of 0.15 s using a WLAN connection with 2 GB/s bandwidth at a service time of 17-6 h. Network operator 2 offers a most suitable latency of 0.1 s using a satellite connection with 1 GB/s at a service time of 6 h-17 h. Hence, the source device 103, 205 selects 114, 307 the offered most suitable QoS guarantee 109 network operator 2 for operating the respective route section 102, 207 assuming a QoS guarantee value 121 of 0.1 s latency when using the respective satellite connection. The QoS guarantee value 121 of 0.1 s is selected 114, 307 for the respective route section 102, 207. In the same way a most suitable QoS guarantee 109 for latency is selected 114, 307 for all other route sections 102 included in the plurality of network routes 101 between the source device 103, 205 and the target device 206. Finally, a shortest path algorithm, such as Dijkstra, is performed on all route sections 102 with their selected 114, 307 most suitable QoS guarantees 109 may be applied to determine 110, 309 the network route 101 with the lowest latency to be expected.

In another example embodiment the source device 103, 205 is restricted to exclude satellite communication technology for data packet transfer (FIG. 6A). The processing follows the methodology as set forth in the previous example. However, since some of the network condition sets 105 are related to satellite communication technology, those network condition sets 105 are skipped in the processing of the priority list 108. An example of processing the first priority list 108, 402, where the source device 103, 205 excludes to use satellite communication technology, is shown in FIG. 6A. The network condition set 105 of priority two is skipped, since it offers a QoS guarantee 109 for a data packet transfer via satellite. The network condition set 105 of priority three is skipped, because the combination of network conditions 107 {1 GB/s, WLAN} has already been assigned 113, 303 with QoS guarantee value 121 from the network conditions set 105 of priority one. As a result, in FIG. 6B the most suitable QoS guarantee 109 offered by the first network operator 104, 400 is selected 114, 307 to operate the respective route section 102, since it still guarantees a latency of 0.15 s over WLAN. The second network operator 104, 401 now offers a latency of 0.2 s over cable as most suitable QoS guarantee, when the source device 103, 205 excludes a communication via satellite.

In contrast to US 2009/0073921 A1, the embodiments disclosed herein determine 110, 309 a most suitable estimated network route 101 on the basis of the offered QoS guarantees 109 of different network operators 104. The methodology allows to determine 110, 309 a most suitable network route 101 in view of the accessed priority lists 108 with offered QoS guarantees 109. Hence, transmission resources throughout the computer network 100, 200 are not loaded with additional data packets which facilitates the capacity planning of the network operators 104. Moreover, this allows for a collaborative balancing between the requirements of the source device 103, 205 to transmit data packets and the task of network operators 104 to balance the load on their operated route sections 102. Additionally, the estimation makes use of the fact, that there are different network operators 104 for at least one of the route sections 102 providing transition of data packets under different conditions based on their own capacity planning. Hence, the source device 103, 205 may select the network route 101 which suits best for their respective requirements depending on the kind of transmission instead of being completely dependent on the operations done without a possibility of control for the source device 103, 205 solely by the network operators 104 or automatized routing algorithms.

In contrast to DE 10 2016 225 164 A1, the embodiments disclosed therein provide control over the determination 110, 309 of a network route 101 from a source device 103, 205 to a target device 206 based on a variety of different QoS metrics that are decision factors for the source device 103, 205 preparing to send data packets to a target device 206. This also allows for a selection of a variety of different network operators 104 potentially offering transmission services according to different QoS metrics which are in conformity with their own network management and resource balancing.

In contrast to the cited prior art, the source device 103, 205 has the control to consider different selection and configuration possibilities in accordance with respective transmission requirements based on the transmission task to be performed, e.g. data backups, video/audio streaming, but also different quality of service metrics as mentioned by way of example therein. The source device 103, 205 also is capable of selecting the operation of route sections 102 via different network operators 104 where available. Hence, the source device 103, 205 is not solely dependent on the automatic load balancing of the computer network 100, 200 or the managed load balancing of specific network operators 104 but has its own scope of influence which network route 101 suites best for the respective transmission task.

In some embodiments, the at least one network condition 106 in the network condition sets 105 is specified by a generic value covering any potential values of the at least one network condition 106. The sequential processing of the network operator priority list 108 along the ordered number of network condition sets 105 includes for each processed network condition set 105, in response to determining that the value 116 of a network condition 106 being part of the requirement subset, as identified by the type 115, 118, is the generic value, setting the respective null QoS guarantee value in the data structure to the specified QoS guarantee value 121 of the processed network condition set 105 in the network operator priority list 108.

In an example embodiment, exemplarily based on the network operator 2 priority list 401 of FIG. 4, the source device 103, 205 prepares to process an overnight online backup, sending an amount of data (e.g. multiple Terabytes) to the target device 206, e.g. a cloud backup storage. Hence, the only suitable time is the night service time 17 h-6 h. Further, the source device 103, 205 considers bandwidth as a decision factor for a most suitable network route 101 for the overnight backup. The source device defines combinations of network conditions 107 focusing on the communication technology and as a subordinate network condition considering latencies under 0.3 s and latencies above this threshold. The source device 103, 205 therewith defines the combinations of network conditions 107 according to its QoS requirements: {<0.3 s, WLAN, 17 h-6 h}, {<0.3 s, satellite, 17 h-6 h}, {<0.3 s, cable, 17 h-6 h}, {≥0.3 s, WLAN, 17 h-6 h}, {≥0.3 s, satellite, 17 h-6 h}, {≥0.3 s, cable, 17 h-6 h} as shown by the matrix data structure in FIG. 7 whereby network condition sets 105 excluding a service time of 17 h-6 h are skipped while reading 302 as described above. FIG. 7 shows the processing of the matrix data structure after applying the set of network conditions of priority three and set of network conditions of priority five. The network condition sets 105 of priority one, two and four have been skipped, since these sets 105 provide their connection only at service time 6 h-17 h not supporting an overnight backup. In the network condition set 105 of priority six, the network operator 104 offers a QoS guarantee value 121 of 1 GB/s bandwidth with a latency above 0.3 s independent of which communication technology is used. In this example, the generic value is indicated by <any> value. Hence, the QoS guarantee 109 applies to all combinations of network conditions 107 with a latency above 0.3 s which ever network technology is required. This applies to the combinations of network conditions 107 {≥0.3 s, WLAN}, {≥0.3 s, satellite}, {≥0.3 s, cable}. Since the combination {0.3 s, WLAN} is already assigned 113, 303 with a QoS guarantee value 121 from the previous network condition set 105 of priority five, only the combinations of network conditions 107 {≥0.3 s, satellite}, {≥0.3 s, cable} are assigned 113, 303, 701 with a QoS guarantee value 121 of 1 GB/s bandwidth when processing the network condition set 105 of priority six. For the same reasons, a QoS guarantee value 121 of 1 GB/s bandwidth is assigned 113, 303, 702 to the combination of network conditions 107 {<0.3 s, cable} when processing the network conditions set 105 of priority seven and a QoS guarantee value 121 of 2 GB/s bandwidth is assigned 113, 303, 703 to the combination of network conditions 107 {<0.3 s, sat} when processing the network condition set 105 of priority eight. Finally, the broadest bandwidth in the matrix data structure, viz. 2 GB/s for a transfer of data packets in the overnight backup using satellite or WLAN technology is selected 305 for the second network operator priority list 108, 403 and is further processed as described above. The source device 103, 205 may further decide to transmit the backup using the satellite communication technology. Latency was defined as subordinate decision factor. Considering this factor, the satellite communication is offered to provide a lower latency.

The advantage of using generic values is, that in some cases, the network operator 104 simplifies the priority lists 108 to a number of especially prioritized network condition sets 105 and summarizing network conditions 106 which the network operator 104 may generically offer. Hence, if the requirements of the source device 103, 205 do not apply to the network condition sets 105 with high priority (among the first network condition sets 105 of a priority list 108), a network operator 104 may in the end define generic values that may be offered to the source device 103, 205 for an estimation of the QoS guarantee 109 to be expected, e.g. by network condition sets 105 with average QoS guarantees 109 for the situation where all previous network condition sets 105 do not meet the requirements of the source device 103, 205. This also reduces computing costs at the source device 103, 205. A most suitable network route 101 is determined on the basis of the offered QoS guarantees 109 to be expected. Generic values take advantage of the fact, that the methodology does not need to determine an exact QoS guarantee in order to determine a most suitable network route 101 from all possible network routes 101 of the computer network 100, 200. An underestimation for the provided QoS guarantees 109 in the priority lists 108 on the basis of generic QoS guarantees is acceptable. However, the source device 103, 205 has to utilize computational costs on QoS guarantees less suitable which may additionally increase computational cost without enhancing results. However, an overestimation for the provided QoS guarantees 109 on the basis of generic QoS guarantees should be avoided, since the QoS guarantees 109 considered are then not reliable for the source device 103, 205 and compromise the determination of a most suitable QoS guarantee 109 to be expected.

In some embodiments, the sequential processing 303 of the network operator priority list 108 along the ordered number of network condition sets 105 further includes for each processed network condition set 105, in response to determining that the value 116 of a network condition 106 being part of the requirement subset, as identified by the type 115, 118, is in accordance with the requirement value 119 and in response to determining 304 that the data structure does not already contain a null quality-of-service guarantee for the quality-of-service guarantee 109 specified by the network condition set 105, discarding the network condition set 105.

In a brute force approach, one may compute all possible combinations of network conditions and applying this to all route sections for all network operator priority lists which are accessible. Since the amount of possible combinations under these circumstances grow fast (exponentially) with the number of provided network nodes (e.g. transfers over non-dedicated network routes as over the internet may include over millions of possible network routes), computing all possible solution in order to find a most suitable network route 101 would load the source device 103, 205 with high computing costs or would not even be possible (at least within a reasonable amount of time). Hence, the embodiments described herein provide a methodology for reducing the number of possible solutions and to find a most suitable solution on the set of remaining solution on the one hand, and allow control of the source device 103, 205 over preferred solutions on the other hand. As a consequence, not all possible solutions may be taken into consideration, but a tradeoff approach is applied, by determining a most suitable network route 101.

For example, QoS guarantees 109 less suitable are not taken into consideration when selecting the most suitable QoS guarantee from the already assigned QoS guarantees. In the previous example, the network condition sets 105 have been discarded, where the matrix data structure already has an assigned 113, 303 QoS guarantee 109 for a respective combination of network conditions 107. Hence, the advantage of discarding network condition sets 105 applying to combinations of network conditions 107 that have already been assigned 113, 303 with a QoS guarantee 109 is, that the computational cost for estimating a QoS guarantee 109 for each combination of network conditions 107 that meet the requirements of the source device 103, 205 is reduced and on the other hand the most suitable QoS guarantees are selected from the already assigned QoS guarantees with high priority as indicated by the network operator priority lists 108.

In some embodiments, the sequential processing of the network operator priority list 108 along the ordered number of network condition sets 105 further includes, for each processed network condition set 105, in response to determining that the value 116 of a network condition 106 being part of the requirement subset, as identified by the type 115, 118, is in accordance with the requirement value 119 and in response to determining that the data structure already does not contain a null quality-of-service guarantee for the quality-of-service guarantee 109 specified by the network condition set 105, replacing the quality-of-service guarantee in the data structure by the quality-of-service guarantee value 121 for the quality-of-service guarantee 109 specified by the currently processed network condition set 105 in response to determining that the quality-of-service guarantee value 121 for the quality-of-service guarantee 109 specified by the currently processed network condition set 105 is more suitable than the quality-of-service guarantee of the data structure.

In an example embodiment, now with reference to FIG. 8, the first priority list 108, 402 is processed as demonstrated in FIG. 5A. But, when the network condition set 105 of priority two is processed, which also applies to the combination of network conditions 107 {1 GB/s, 6 h-17 h} already assigned 113, 303 when processing the network condition set 105 of priority one, the already assigned QoS guarantee value 121 is compared to the current QoS guarantee value 121 provided by the actual processing of the network condition set 105 of priority three. Since the current QoS guarantee value 121 provided is a latency of 0.1 s and for latency a minimum QoS guarantee 109 is most suitable, the QoS guarantee value 121 previously assigned 113, 303 (0.6 s) is substituted 800 by the more suitable QoS guarantee value 121 (0.1 s). The processing continues in the same way, until all combinations of network conditions 107 are assigned 113, 303 with a QoS guarantee 109, viz. the matrix data structure does not contain any <null> quality-of-service guarantee value anymore 304. In this example embodiment, the selection 305, 801 of the most suitable QoS guarantee value 121 for the priority list 108 yields 0.1 s. The source device 103, 205 selects between operating the respective route section 102 with a QoS guarantee value 121 of 0.1 s by the first network operator 104, 400 offering a network communication with a bandwidth of 1 GB/s at a service time of 6 h-17 h and via WLAN communication technology or by the second network operator 104, 401 offering the same QoS guarantee value 121 for a network communication with bandwidth of 1 GB/s at a service time of 6 h-17 h, but utilizing a satellite communication technology as already shown in FIG. 5B on the right-hand side.

Substituting more suitable QoS guarantees 109, on the one hand, may add additional computing costs, but these additional computing costs are still restricted by the abort criterion terminating the processing when each combination of network conditions 107 that meet the requirements of the source device 103, 205 are assigned 113, 303 with a QoS guarantee value 121. On the other hand, the substitution potentially leads better QoS guarantees 109 considered by the route determination process (compared to the discarding variant described above) until the abort criterion is reached.

In some embodiments, the network conditions 106, 117 include at least one of the types (115, 118): time of network usage, transmission technology of the route section 102, latency, jitter, packet loss rate and/or bandwidth.

In some embodiments, the QoS guarantees 109 in the priority lists 108 include at least one of the types 120: latency, packet loss rate and/or jitter. The most suitable quality-of service guarantee 109 then is given by the minimum determined 114, 307 quality-of-service guarantee 109.

In some embodiments, the QoS guarantees 109 in the priority list 108 include the type 120: bandwidth. The most suitable QoS is given by the maximum determined 114, 307 quality-of-service guarantee 109.

In contrast to US 2009/0073921 A1 and DE 10 2016 225 164 A1, the embodiments described herein allow for a wide variety of QoS metrics to be accessed by a source device 103, 205 in order to decide on a most suitable network route 101 for respective transmission tasks. Hence, it allows the source device 103, 205 to weighting up alternative network routing solutions in advance to estimate a most suitable network route 101.

In some embodiments, determining 110, 309 the network route 101 along a plurality of route sections 102 being assigned 114, 307 with a minimum determined quality-of-service guarantees 309 is performed by a Dijkstra shortest path algorithm.

In an example embodiment, the determined QoS guarantees 109 are given by a minimum determined 114, 307 latency offered in the network operator priority lists 108 for each of the route sections 102, as is shown in FIG. 2. First, all nodes participating at the search for a shortest path are initialized, e.g. by assigning an infinity value. The search for a shortest path then starts at the start node 900 representing the source device 103, 205. The Dijkstra algorithm now visits all nodes that are connected with the start node 900. In the example of FIG. 2 and FIG. 9, there is only one successor node 901 for the start node 900. The start node 900 is connected to the successor node 901 by an edge 902 with a weight 0.2 s which has previously been selected 114, 307 by the steps 300 to 307 of FIG. 3 to be the minimum offered latency estimated for this route section 102. The successor node 901 is relaxed by substituting the initialized infinity value for this node by the weight 0.2 s. In the next iteration, the Dijkstra algorithm visits all succeeding nodes 903, 904 that are connected with the successor node 901. Again, these nodes are relaxed by substituting the initial infinity value by a summed-up weight of all predecessor edges. Hence, the first successor node 903 visited from the actual node is assigned with a weight of 0.2 s+0.6 s=0.8 s. The second successor node 904 is assigned with a weight of 0.2 s+0.4 s=0.6 s. In the next iteration, there is an additional edge 905 between the two successor nodes 903 and 904 with weight 0.1 s. Relaxing the first successor node 903 by this additional edge reveals, that following the path of the nodes 900, 901, 904 and 905 sums up to a total latency of 0.7 s instead of 0.8 s which was already assigned for the direct path following 900, 901 and 903. Hence, the node is relaxed at this point by substituting the previously assigned value of 0.8 s by the value of the shorter path 0.7 s. The Dijkstra algorithm then proceeds in the same way now visiting all nodes that are reachable from the current node 903 and so on, until all nodes included in network routes 101 from the start node 900 to the target node 906 are visited and relaxed. The most suitable network route 101 determined 110, 309 then is the shortest network route 101 from the source device 103, 205 to the target device 206 with an estimated latency of 2.4 s (bold lines in FIG. 9) for transmitting the data-packets. It is estimated, since the network operators 104 offered the respective QoS guarantees 109 for the route sections 102 as a guarantee to be expected by the source device 103, 205 at time of transmission. The true latency, which may be measured at time of transmission may differ from the estimated latency based on the offers of the network operators 104 in the priority lists 108. Determining 110, 309 the network route 101 with a minimum QoS guarantee 109 for e.g. latency is however not restricted to be performed by the Dijkstra algorithm, but any suitable algorithm may be employed. Further, determining 110, 309 a network route 101 with a maximum QoS guarantee 109 for e.g. bandwidth may be implemented in any suitable way.

In some embodiments, the source device 103, 205 determining 110, 309 a network route 101 considers route sections 102 for which no priority list 108 is available to be accessed by the source device 103, 205. When a most suitable network route 101 is determined 110, 309, the source device 103, 205 assumes a suitable QoS guarantee 109 for the considered route section 102.

In an example embodiment following the computer network 100, 200 example in FIG. 2 and FIG. 9, the source device 103, 205 has knowledge of an additional route section 102 for which the source device 103, 205 has no access 111 to priority lists 108 of network operators 104. FIG. 10 shows a detail of the computer network 100, 200 in FIG. 2 and in FIG. 9 with such an additional route section 102, 1000. Since there is no priority list 108 for the additional route section 102, 1000 accessible 111, the source device 103, 205 applies a default latency, such as an average latency 1001 of 0.3 s for the additional route section 102, 1000, or a minimum latency to avoid overestimation. The considered QoS guarantee 109 for such an additional route section 102 may be determined in any suitable way, e.g. on the basis of historical data, averaging QoS guarantees 109 of neighbored route sections 102 or by setting pre-defined values. When the Dijkstra algorithm proceeds the relaxation from the respective node 1002, the source device 103, 205 also considers the additional route section 102, 1000 directly connecting the current node 1002 with the target node 906. The relaxation then results 1003 in a total path weight of 2.3 s instead of 2.4 s. Hence, the additional route section 102, 1000 is part of the shortest path which now has a total estimated latency of 2.3 s instead of 2.4 s that has been determined 110, 309 without the additional route section 102, 1000.

Considering route sections 102 for which no priority list 108 is accessible, but which are known by the source device 103, 205 has at least two enhancing aspects. First, this allows to further enhance to find possible most suitable network routes 101, as already shown in the example above, by considering potentially more suitable network routes in fact known although there is no priority list 108 for some of the route sections 102 available. Second, there may be situations where no complete network route 101 is provided on the basis of accessible priority lists 108, viz. there is no network route 101 including only route sections 102 for which at least one priority list 108 is provided, e.g. there are holes in the complete coverage of the computer network 100 in view of accessible priority lists 108. The methodology described herein then still allows for a determination of a suitable network route 101, considering known edges with assumed suitable QoS guarantees without accessing a priority list 108.

In some embodiments, the QoS guarantee 109 assigned 113, 303 to a combination of network conditions 107 is determined by an aggregation of QoS guarantees 109 of different types 120.

The embodiments included therein are not restricted to determining 110, 309 a most suitable network route 101 on the basis of QoS guarantees 109 relating to a single network parameter such as latency or bandwidth. To the contrary, some transmission tasks require sets of operational quality of service metrics to be fulfilled. In example embodiments, the QoS guarantees 109 selected 114, 307 for the respective route sections 102 may be aggregated values for example considering an aggregation of low latency, low packets loss, low jitter in connection with high bandwidth in order to perform high quality video conferencing. These aggregations however may be implemented in any suitable way and are not restricted to special procedures.

In some embodiments, at least a part of the network operator priority lists 108 is updated upon a request by the source device 103, 205 or by a provision from the respective network operator 104.

Network operator priority lists 108 may change in the course of time since network operators 104 manage their computer networks 100, 200 and related route sections 102 in a dynamic way, therewith adapting the network resources to the actual transmission situation in the computer networks 100, 200 to be operated. Hence, in order to provide reliable quality-of-service guarantees 109 in the priority lists 108, the priority lists 108 are updated. In some example embodiments, the actual priority lists 108 are located at the network operator site and pulled from or pushed to the source device 103, 205 for an update. In other example embodiments, the actual priority lists 108 are located at the source device 103, 205 site and pulled from or pushed to the source device 103, 205 for an update. In some example embodiments, the update of a priority list 108 is performed directly before determining 110, 309 a suitable network route 101 and/or route section 102, e.g. by the source device 103, 205 retrieving the current version of the priority list 108 from a remote location, such as a webserver. In other example embodiments, the priority lists 108 are updated when the network operator 104 issues a modified priority list 108, e.g. as a result of balancing the route sections 102 operated by the network operator 104. In some example embodiments, the priority lists 108 are updated periodically over time.

FIG. 11 is a diagrammatic representation of the internal component of a computer system 1100 arranged as a source device 103, 205. The computer system 1100 includes a set of instructions to cause the computer system 1100 to perform any of the methodologies discussed herein when executed by the computer system 1100. The computer system 1100 includes one or more processors 1101, a main memory 1102 and a network interface device 1103 which communicate with each other via a bus 1104. Optionally, the computer system 1100 may further include a static memory 1105 and a disk-drive unit. A video display, an alphanumeric input device and a cursor control device may be provided as examples of user interface 1106. The network interface device 1103 connects the computer system 1100 at least to target device 206.

A set of computer-executable instructions (i.e., computer program code) embodying any one, or all, of the methodologies described above, resides completely, or at least partially, in or on a machine-readable medium, e.g., the main memory 1102. The instructions may further be transmitted or received as a propagated signal via the Internet through the network interface device 1103. Basic operation of the computer system 1100 including the user interface 1106 and the network interface device 1103 is controlled by an operating system which is also located in the main memory 1102, the one or more processors 1101 and/or the static memory 1105.

In general, the routines executed to implement the embodiments of the invention, whether implemented as part of an operating system or a specific application, component, pro-gram, object, module or sequence of instructions, or even a subset thereof, may be referred to herein as "computer program code" or simply "program code". Program code typically comprises computer-readable instructions that are resident at various times in various memory and storage devices 1102, 1105 in a computer system 1100 and that, when read and executed by one or more processors 1101 in a computer system 1100, cause that computer system 1100 to perform the operations necessary to execute operations and/or elements embodying the various aspects of the embodiments of the invention. Computer-readable program instructions for carrying out operations of the embodiments of the invention may be, for example, assembly language or either source code or object code written in any combination of one or more programming languages.

Various program code described herein may be identified based upon the application within that it is implemented in specific embodiments of the invention. However, it should be appreciated that any particular program nomenclature that follows is used merely for convenience, and thus the invention should not be limited to use solely in any specific application identified and/or implied by such nomenclature. Furthermore, given the generally endless number of manners in which computer programs may be organized into routines, procedures, methods, modules, objects, and the like, as well as the various manners in which program functionality may be allocated among various software layers that are resident within a typical computer system 1100 (e.g., operating systems, libraries, API's, applications, applets, etc.), it should be appreciated that the embodiments of the invention are not limited to the specific organization and allocation of program functionality described herein.

The program code embodied in any of the applications/modules described herein is capable of being individually or collectively distributed as a program product in a variety of different forms. In particular, the program code may be distributed using a computer-readable storage medium having computer-readable program instructions thereon for causing a processor 1101 to carry out aspects of the embodiments of the invention.

Computer-readable storage media, which is inherently non-transitory, may include volatile and non-volatile, and removable and non-removable tangible media implemented in any method or technology for storage of information, such as computer-readable instructions, data structures, program modules, or other data. Computer-readable storage media may further include random access memory (RAM), read-only memory (ROM), erasable programmable read-only memory (EPROM), electrically erasable programmable read-only memory (EEPROM), flash memory or other solid state memory technology, portable compact disc read-only memory (CD-ROM), or other optical storage, magnetic cassettes, magnetic tape, magnetic disk storage or other magnetic storage devices, or any other medium that can be used to store the desired information and which can be read by a computer. A computer-readable storage medium should not be construed as transitory signals per se (e.g., radio waves or other propagating electromagnetic waves, electromagnetic waves propagating through a transmission media such as a waveguide, or electrical signals transmitted through a wire). Computer-readable program instructions may be downloaded to a computer, another type of programmable data processing apparatus, or another device from a computer-readable storage medium or to an external computer or external storage device via a network.

Computer-readable program instructions stored in a computer-readable medium may be used to direct a computer, other types of programmable data processing apparatus, or other devices to function in a particular manner, such that the instructions stored in the computer-readable medium produce an article of manufacture including instructions that implement the functions, acts, and/or operations specified in the flow charts, sequence diagrams, and/or block diagrams. The computer program instructions may be provided to one or more processors 1101 of a general-purpose computer system, a special purpose computer system e.g. clients, servers, or other programmable data processing apparatus, e.g. routers, to produce a machine, such that the instructions, which execute via the one or more processors, cause a series of computations to be performed to implement the functions, acts, and/or operations specified in the flow charts and/or sequence diagrams.

The terminology used herein is for the purpose of describing particular embodiments only and is not intended to be limiting of the embodiments of the invention. It will be further understood that the terms "comprise" and/or "comprising", when used in this specification, specify the presence of stated features, integers, steps, operations, elements, and/or components, but do not preclude the presence or addition of one or more other features, integers, steps, operations, elements, components, and/or groups thereof. Furthermore, to the extent that the terms "includes", "having", "has", "with", "comprised of", or variants thereof are used in either the detailed description or the claims, such terms are intended to be inclusive in a manner similar to the term "comprising".

While all of the invention has been illustrated by a description of various embodiments and while these embodiments have been described in considerable detail, it is not the intention to restrict or in any way limit the scope of the appended claims to such detail. Additional advantages and modifications will readily appear to those skilled in the art. The invention in its broader aspects is therefore not limited to the specific details, representative apparatus and method, and illustrative examples shown and described. Accordingly, departures may be made from such details without departing from the spirit or scope of the general inventive concept.

The invention claimed is:

1. A method for determining a network route from a source device to a target device through a computer network, wherein the source device is connected to the target device via a plurality of network routes each comprising at least one route section, wherein at least one of the route sections is operated by at least two network operators, wherein the source device has access to network operator priority lists for at least a subset of the route sections, wherein each network operator priority list specifies quality-of-service guarantees of the network operator for an ordered number of network condition sets, the method comprising, at the source device:

for each route section considered and each network operator priority list available for the considered route section:
sequentially processing the network operator priority list along the ordered number of network condition sets to determine the specified quality-of-service guarantees for network condition sets that match required network condition combinations of the source device,
aborting the sequential processing in response to determining that a quality-of-service guarantee is determined for each network condition set that matches the required network condition combinations of the source device,
selecting a quality-of-service guarantee among the determined quality-of-service guarantees, according to a selection criterion;
determining a network route from the plurality of network routes between the source device to the target device on the basis of the determined quality-of-service guarantees for the route sections.

2. The method according to claim 1, wherein the network condition sets comprise one or more individual network conditions being defined by at least a respective type and a value, wherein the network condition sets that match the required network condition combinations of the source device comprise at least a requirement subset of the individual network conditions and are defined by a type and a requirement value, respectively; wherein sequentially processing the network operator priority list along the number of network condition sets further comprises:
initializing a data structure for processing the network condition sets that the required network condition combinations of the source device with respective null quality-of-service guarantee values;
for each processed network condition set, in response to determining that the value of a network condition being part of the requirement subset, as identified by the type, is in accordance with the requirement value, setting the respective null quality-of-service guarantee value in the data structure to a specified quality-of-service guarantee value of the processed network condition set in the network operator priority list; and
aborting the sequential processing in response to determining that the data structure does not contain any null quality-of-service guarantee value anymore.

3. The method according to claim 2, wherein at least one network condition in the network condition sets is specified by a generic value covering any potential values of the at least one network condition, wherein sequentially processing the network operator priority list along the ordered number of network condition sets comprises, for each processed network condition set, in response to determining that the value of a network condition being part of the requirement subset, as identified by the type, is the generic value, setting the respective null quality-of-service guarantee value in the data structure to the specified quality-of-service guarantee value of the processed network condition set in the network operator priority list.

4. The method according to claim 3, wherein sequentially processing the network operator priority list along the number of network condition sets further comprises, for each processed network condition set, in response to determining that the value of a network condition being part of the requirement subset, as identified by the type, is in accordance with the requirement value and in response to determining that the data structure already does not contain a null quality-of-service guarantee value for the quality-of-service guarantee specified by the network condition set, discarding the network condition set.

5. The method according to claim 3, wherein sequentially processing the network operator priority list along the number of network condition sets further comprises, for each processed network condition set, in response to determining that the value of a network condition being part of the requirement subset, as identified by the type, is in accordance with the requirement value and in response to determining that the data structure already does not contain a null quality-of-service guarantee value for the quality-of-service guarantee specified by the network condition set, replacing the quality-of-service guarantee in the data structure by the quality-of-service guarantee value for the quality-of-service guarantee specified by the currently processed network condition set in response to determining that the quality-of-service guarantee value for the quality-of-service guarantee specified by the currently processed network condition set is more suitable than the quality-of-service guarantee of the data structure.

6. The method according to claim 1, wherein the network conditions include at least one of a type: time of network usage, transmission technology of the route section, latency, jitter, packet loss rate, bandwidth.

7. The method according to claim 1, wherein the quality-of-service guarantees in the priority lists include at least one of a type: latency, packet loss rate and jitter, and wherein the selection criterion is a minimum determined quality-of-service auarantee.

8. The method according to claim 1, wherein the quality-of-service guarantees in the priority list include a type:

bandwidth, and wherein the selection criterion is a maximum determined quality-of-service guarantee.

9. The method according claim 1, wherein the quality-of service guarantee assigned to a combination of network conditions is determined by an aggregation of quality-of-service guarantees of different types.

10. The method according claim 1, further comprising updating at least a part of the network operator priority lists upon a request by the source device or by a provision from the respective network operator.

11. A source device for determining a network route from a source device to a target device through a computer network, wherein the source device is connected to the target device via a plurality of network routes each comprising at least one route section, wherein at least one of the route sections is operated by at least two network operators, wherein the source device has access to network operator priority lists for at least a subset of the route sections, wherein each network operator priority list specifies quality-of-service guarantees of the network operator for an ordered number of network condition sets, the source device comprising:
   a memory; and
   a processor configured to:
      for each route section considered and each network operator priority list available for the considered route section:
         sequentially process the network operator priority list along the ordered number of network condition sets to determine the specified quality-of-service guarantees for network condition sets that match required network condition combinations of the source device,
         abort the sequential processing in response to determining that a quality-of-service guarantee is determined for each network condition set that matches the required network condition combinations of the source device,
         select a most suitable quality-of-service guarantee among the determined quality-of-service guarantees;
      determine a network route from the plurality of network routes between the source device to the target device on the basis of the determined quality-of-service guarantees for the route sections.

12. A computer program product comprising program code instructions stored on a non-transitory computer readable medium executable on a computer to determine a network route from a source device to a target device through a computer network, wherein the source device is connected to the target device via a plurality of network routes each comprising at least one route section, wherein at least one of the route sections is operated by at least two network operators, wherein the source device has access to network operator priority lists for at least a subset of the route sections, wherein each network operator priority list specifies quality-of-service guarantees of the network operator for an ordered number of network condition sets, the instructions executable to:
   for each route section considered and each network operator priority list available for the considered route section:
      sequentially process the network operator priority list along the ordered number of network condition sets to determine the specified quality-of-service guarantees for network condition sets that match required network condition combinations of the source device,
      abort the sequential processing in response to determining that a quality-of-service guarantee is determined for network condition set that matches the required network condition combinations of the source device,
      select a most suitable quality-of-service guarantee among the determined quality-of-service guarantees;
   determine a network route from the plurality of network routes between the source device to the target device on the basis of the determined duality-of-service guarantees for the route sections.

* * * * *

UNITED STATES PATENT AND TRADEMARK OFFICE
CERTIFICATE OF CORRECTION

| | | |
|---|---|---|
| PATENT NO. | : 11,516,144 B2 | Page 1 of 1 |
| APPLICATION NO. | : 16/818158 | |
| DATED | : November 29, 2022 | |
| INVENTOR(S) | : Huiban et al. | |

It is certified that error appears in the above-identified patent and that said Letters Patent is hereby corrected as shown below:

On the Title Page

Item (30)
Please insert:
--Foreign Application Priority Data
March 13, 2019 (FR) 1902554--

Signed and Sealed this
Twenty-third Day of May, 2023

Katherine Kelly Vidal
*Director of the United States Patent and Trademark Office*